US011683821B2

(12) United States Patent
Aijaz

(10) Patent No.: US 11,683,821 B2
(45) Date of Patent: Jun. 20, 2023

(54) RESOURCE ALLOCATION TECHNIQUES FOR OPTIMIZED MULTI-USER CLOSED-LOOP CONTROL OVER 5G WIRELESS NETWORKS

(71) Applicant: Kabushiki Kaisha Toshiba, Minato-ku (JP)

(72) Inventor: Adnan Aijaz, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 464 days.

(21) Appl. No.: 16/851,556

(22) Filed: Apr. 17, 2020

(65) Prior Publication Data

US 2021/0329653 A1 Oct. 21, 2021

(51) Int. Cl.
*H04W 72/00* (2023.01)
*H04W 72/54* (2023.01)
*H04W 72/12* (2023.01)

(52) U.S. Cl.
CPC .......... *H04W 72/54* (2023.01); *H04W 72/12* (2013.01)

(58) Field of Classification Search
CPC .............................. H04W 72/08; H04W 72/12
See application file for complete search history.

(56) References Cited

U.S. PATENT DOCUMENTS 10,135,591 B2   11/2018   Chen et al.
10,165,491 B1*  12/2018   Sitaram ........... H04W 36/00837
2016/0128076 A1*  5/2016   Langereis ............. H04W 76/27
                                                    370/336
2018/0092104 A1   3/2018   Sheng et al.
2020/0267511 A1*  8/2020   Abdoli .................. H04L 5/0094
2021/0345304 A1* 11/2021   Munier ............... H04W 72/042

OTHER PUBLICATIONS

Aijaz, A. et al., "The Tactile Internet for Industries: A Review," Proceedings of the IEEE, vol. 107, No. 2, Feb. 2, 2019, 22 pages.
Aijaz, A., "Packet Duplication in Dual Connectivity Enabled 5G Wireless Networks: Overview and Challenges," IEEE Communications Standards Magazine, arXiv:1804.01058v2 [cs.NI], May 29, 2019, 9 pages.

* cited by examiner

*Primary Examiner* — Rhonda L Murphy
(74) *Attorney, Agent, or Firm* — Oblon, McClelland, Maier & Neustadt, L.L.P.

(57) ABSTRACT

In general terms, network resource allocation takes place within a wireless communication channel in which resource is defined with respect to time and frequency; a resource allocation process involves joint allocation of resource for communication to and from group of devices, to enable a cyclic exchange of information between the devices and a base-station and thus to enable wireless closed loop control of the device. By jointly allocating resources in one go, overheads are reduced thereby providing a more efficient resource allocation mechanism. Furthermore, bundled transmissions are scheduled, including repetitions of transmissions to increase the likelihood of transmission success. By determining a minimum bundle length required to meet a predefined threshold for received signal quality, the reliability of the transmissions can be ensured.

14 Claims, 12 Drawing Sheets

RESOURCE ALLOCATION TECHNIQUES FOR OPTIMIZED MULTI-USER CLOSED-LOOP CONTROL OVER 5G WIRELESS NETWORKS

TECHNICAL FIELD

The present disclosure relates to methods and systems for scheduling uplink and downlink wireless transmissions for closed loop control. In particular, but without limitation, this disclosure relates to a method and a computing system for scheduling uplink and downlink wireless transmissions for closed loop control for a group of devices, for instance, within a 5G wireless communication network.

BACKGROUND

Closed loop control has habitually been implemented using wired communication, due to requirements for very low and deterministic latency and very high reliability.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
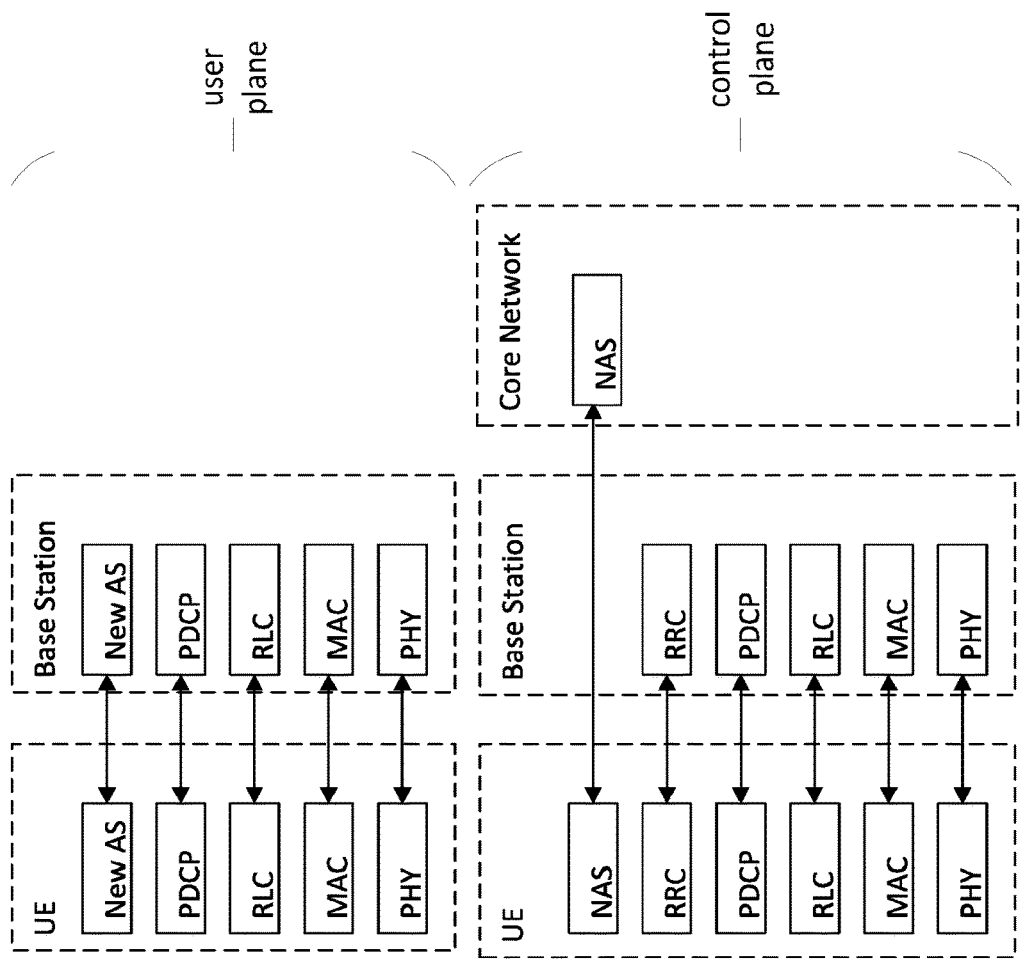
FIG. 1 shows a network and protocol stack for use with the implementations described herein.
Figure 1:
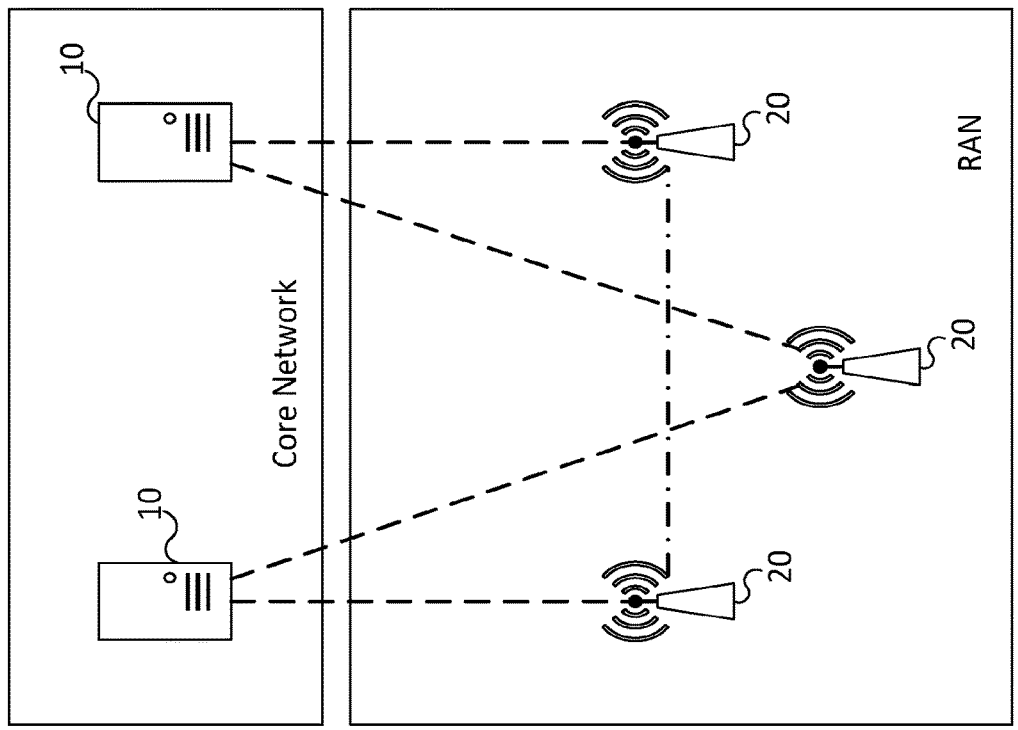

In general terms, network resource allocation takes place within a wireless communication channel in which resource is defined with respect to time and frequency; a resource allocation process involves joint allocation of resource for communication to and from group of devices, to enable a cyclic exchange of information between the devices and a base-station and thus to enable wireless closed loop control of the device. By jointly allocating resources in one go, overheads are reduced thereby providing a more efficient resource allocation mechanism. Furthermore, bundled transmissions are scheduled, including repetitions of transmissions to increase the likelihood of transmission success. By determining a minimum bundle length required to meet a predefined threshold for received signal quality, the reliability of the transmissions can be ensured.

Industrial communication has a long history, which spans more than four decades. The latest generation of industrial networks has started to embrace wireless technologies; however, current industrial wireless solutions are mainly used for non-critical applications such as industrial monitoring.

The use of wireless for control applications is still in infancy. Although some proprietary industrial wireless technologies based on Bluetooth or Wi-Fi have emerged, such solutions only meet the requirements of specific industrial applications.

The emerging 5G mobile/cellular networks are being designed with native support for three main service categories: enhanced mobile broadband (eMBB) for supporting very high data rates, massive machine type communications (mMTC) for supporting a large number of devices and ultra-reliable low latency communications (uRLLC) for real-time control applications. Hence, 5G provides a single unified wireless interface for meeting the requirements of a range of industrial applications.

One of the most prominent industrial applications is closed-loop control that, in the case of legacy industrial systems, is realized through wired technologies. 5G uRLLC creates the possibility of realizing such closed-loop control over wireless, thereby leading to many design simplifications in legacy industrial systems. Moreover, the possibility of closed-loop control over wireless creates unprecedented industrial applications for future industrial systems (Industry 4.0 and beyond).

For effective closed-loop control in a real time application, it is desirable to provide connectivity with very low latency and very high reliability.

Closed-loop control can involve bi-directional communication between a controller and a spatially distributed system of one or multiple sensors/actuators. Such bi-directional communication has a cyclic traffic pattern that requires deterministic connectivity, i.e., minimal jitter in terms of latency between consecutive cycles.

The latency, and to some extent, the reliability requirements of closed-loop control can be fulfilled by some of the key standard features of 5G wireless networks. However, handling bi-directional cyclic information exchange with deterministic as well as minimal latency requires efficient radio resource allocation techniques. Such radio resource allocation techniques are typically left outside the scope of mobile/wireless standards. It is worth emphasizing that deterministic latency is also required for converged operation of 5G and Time-sensitive Networking (TSN).

Typically closed-loop control takes place between a controller and one or more devices. For example, remote control of mobile platforms in industrial systems or field-level communication between a controller and multiple sensors/actuators in industrial automation.

This application mainly focuses on the scenario of closed-loop control between a single controller and multiple devices through a 5G network. This scenario reflects a range of industrial applications including field-level communication in industrial automation networks, remote control of mobile platforms and collaborative remote operation of industrial machines or robots.

To this end, this application discusses a novel radio resource allocation framework, termed as multi-user Deterministic 5G (Det-5G), for realizing closed-loop control over 5G wireless networks.

According to a first aspect there is provided a computing system for scheduling uplink and downlink wireless transmissions for closed loop control between a controller and a group of devices in a wireless network. The computing system comprises a processor configured to: determine a wireless resource allocation for downlink transmission from a base station to the group of devices and uplink transmission from the group of devices to the base station, wherein the wireless resource allocation schedules bundled transmissions over available wireless resources and wherein each bundled transmission includes one or more repetitions of data to improve a likelihood of successful receipt of the data. Determining the wireless resource allocation comprises, for each bundled transmission: determining a minimum bundle length specifying a minimum number of repetitions within the bundled transmission required to meet a predefined threshold for received signal quality; and determining the wireless resource allocation to meet the determined minimum bundle length. The processor is further configured to send to the group of devices a joint resource allocation message comprising wireless resource allocation information defining the wireless resource allocation to enable completion of a cycle of closed loop control over the wireless network.

Repetitions of transmissions allow the likelihood of transmission success to be increased, thereby reducing the transmission and computational overhead associated with implementing retransmissions of failed transmissions. By determining a minimum bundle length required to meet a predefined threshold for received signal quality, the reliability of the transmissions can be ensured.

Downlink transmissions may be via one or more multicast transmissions from the base station to all devices in group. Uplink transmission may include, for each device, one or more individual bundled transmissions from the device to the base station.

The computing system may be integrated within the base station or may be external to the base station and otherwise connected to the base station (e.g. via wired or wireless connection).

The received signal quality may be a signal to noise ratio (or a signal to noise plus interference ratio) based on a measure of received signal strength (e.g. average RSSI or variability in RSSI).

In one implementation, determining a minimum bundle length comprises: obtaining a measurement of a previous received signal quality for a previous bundled transmission to an intended recipient for the bundled transmission; and determining, based on the previous received signal quality, the minimum number of repetitions that would provide sufficient gain to meet the predefined threshold for received signal quality. This helps to ensure that sufficient gain is provided by the bundled transmissions to meet the predefined threshold for received signal quality.

According to an implementation, downlink transmission is scheduled as a multi-cast transmission to the group of devices and obtaining a measurement of a previous received signal quality for a previous downlink bundled transmission comprises determining a minimum received signal quality for the previous downlink bundled transmission across the group of devices. Each device may report a measurement of received signal quality and the computing system may determine the minimum from these measurements. This helps to ensure that sufficient gain is applied to the downlink transmission(s) to reach all devices in the group.

In one implementation, the processor is further configured to, for a subsequent cycle of closed loop control over the wireless network and in response to determining that the received signal quality for a bundled transmission from a previous cycle has fallen below the predefined threshold for received signal quality, increase the minimum bundle length for the bundled transmission such that sufficient gain is provided to meet the predefined threshold for received signal quality.

According to an implementation, determining the wireless resource allocation to meet the determined minimum bundle length comprises assigning, for each transmission, a set of wireless resource elements distributed over time and sub-carrier frequency, wherein the set of wireless resource elements are determined such that one or both of the overall transmission time and overall sub-carrier frequency allocation are minimized whilst ensuring the predefined threshold for received signal quality is met.

According to an implementation, for each bundled transmission, one or more of the repetitions of data are transmitted with forward error correction information. All, or a subset of the repetitions may have forward error correction information. The amount of forward error correction information in each repetition may vary or may be constant.

According to an implementation the processor is further configured to send, via a wireless transmitter, a downlink bundled transmission to the group of devices using to the allocated wireless resources for downlink transmission and receive from each device in the group, via a wireless receiver, an uplink bundled transmission over the allocated wireless resources for uplink transmission.

This may occur in one cyclic exchange, and can repeat over multiple cycles using the same resources or adjusting resources between cycles. One cycle may include the a joint resource allocation message, downlink transmission, receipt of uplink transmissions and, optionally, receipt of uplink acknowledgements of receipt.

According to an implementation the processor is further configured to: determine a wireless resource allocation for an uplink acknowledgement of receipt from each device in the group; include the wireless resource allocation for the uplink acknowledgements of receipt in the joint resource allocation message; and, in response to a failure to receive an acknowledgement of receipt from one or more of the devices over the allocated wireless resources for uplink acknowledgements of receipt, reallocate the one or more devices into a different group and, in a subsequent cycle of closed loop control, allocate wireless resources for uplink and downlink transmissions to the different group separately to the allocation of wireless resources to the group. Accordingly, in the (unexpected) event that one or more transmissions fail, the devices for which the transmissions failed may be reallocated to another group for the purposes of receiving retransmissions.

According to a further implementation, the wireless resources are divided into subgroupings of symbols and subcarriers; and, for each bundled transmission, the repetitions of data are repeated across adjacent subgroupings. Each subgrouping may be a short transmission time interval or a mini-slot.

According to an implementation, the joint resource allocation message is sent using wireless resources that are specifically allocated to the sending of the joint resource allocation message and are separate from wireless resources for transmission of payload data to the devices. For instance, the joint resource allocation message may be sent in a short transmission time interval or mini-slot that is specifically allocated to the joint resource allocation message.

According to a further implementation, the joint resource allocation message is sent using wireless resources that fall within a subset of wireless resources that may also be shared with downlink transmissions. For instance, the joint resource allocation message may be sent using wireless resources within one or more short transmission time intervals or one or more mini-slots during which payload data may also be sent to the devices. The joint resource allocation message may be sent using wireless resources that form a contiguous grouping with one or more downlink transmissions.

According to a further aspect there is provided a computer-implemented method for scheduling uplink and downlink wireless transmissions for closed loop control between a base station and a group of devices in a wireless network, the method comprising: determining a wireless resource allocation for downlink transmission from the base station to the group of devices and uplink transmission from the group of devices to the base station, wherein the wireless resource allocation schedules bundled transmissions over available wireless resources and wherein each bundled transmission includes one or more repetitions of data to improve a likelihood of successful receipt of the data. Determining the wireless resource allocation comprises, for each bundled transmission: determining a minimum bundle length specifying a minimum number of repetitions within the bundled transmission required to meet a predefined threshold for received signal quality; and determining the wireless resource allocation to meet the determined minimum bundle length. The method further comprises sending to the group of devices a joint resource allocation message comprising wireless resource allocation information defining the wireless resource allocation to enable completion of a cycle of closed loop control over the wireless network.

According to a further aspect there is provided a non-transitory computer readable medium comprising computer-executable instructions that, when executed by a processor, cause the processor to implement a method for scheduling uplink and downlink wireless transmissions for closed loop control between a base station and a group of devices in a wireless network. The method comprises: determining a wireless resource allocation for downlink transmission from the base station to the group of devices and uplink transmission from the group of devices to the base station, wherein the wireless resource allocation schedules bundled transmissions over available wireless resources and wherein each bundled transmission includes one or more repetitions of data to improve a likelihood of successful receipt of the data. Determining the wireless resource allocation comprises, for each bundled transmission: determining a minimum bundle length specifying a minimum number of repetitions within the bundled transmission required to meet a predefined threshold for received signal quality; and determining the wireless resource allocation to meet the determined minimum bundle length. The method further comprise sending to the group of devices a joint resource allocation message comprising wireless resource allocation information defining the wireless resource allocation to enable completion of a cycle of closed loop control over the wireless network.

Accordingly, implementations may be embodied in a variety of forms, including devices, methods and non-transitory computer-readable media.

Multi-User Det-5G: Design Aspects and Protocol Operation

This application primarily focuses on the scenario of closed-loop control between a single controller and multiple devices through a 5G network. This scenario reflects a range of industrial applications including field-level communication in industrial automation networks, remote control of mobile platforms and collaborative remote operation of industrial machines or robots.

FIG. 1 shows a network and protocol stack for use with the implementations described herein. This illustrates the architecture for a 5G New Radio (NR) network. The network is divided into a core network and a radio access network (RAN). The core network comprises controllers 10 that are configured to manage the network. The radio access network comprises base stations 20 for communicating wirelessly with end devices (not shown).

Each controller 10 is configured to communicate with end devices via base stations 20. To this end, each controller 10 is connected to each base station 20 either wirelessly or via a direct (e.g. wired) connection.

Whilst three base stations 20 are shown in FIG. 1, it will be appreciated that any number of base stations may be utilized with the present methodology.

FIG. 1 also shows the protocol stack for a 5G New Radio network. This shows the user-plane as well as the control-plane.

The terminology for the protocol stack layers is as follows. The 4G Long Term Evolution (LTE) network has a similar architecture with a slightly different terminology for entities and interfaces. The 4G-LTE network has a similar protocol stack with the exception of the access stratum (AS) layer; however, the actual protocol layer functionality could be different for the two networks.

PHY—Physical layer
MAC—Medium access control layer
RLC—Radio link control layer
PDCP—Packet data convergence protocol layer
RRC—Radio resource control layer
NAS—Non-access stratum layer
AS—Access stratum layer One of the main differences between 4G-LTE and 5G-NR is that the former uses a fixed numerology of 15 kHz orthogonal frequency division multiplexing (OFDM) sub-carrier spacing, whereas the latter supports a scalable numerology with sub-carrier spacing of 15 kHz, 30 kHz, and 60 kHz for below 6 GHz and 60 kHz and 120 kHz for above 6 GHz operation. A higher sub-carrier spacing leads to reduction in timeslot duration. In 4G-LTE, a slot comprises 14 OFDM symbols and corresponds to a transmission time interval (TTI). A reduction in TTI is possible through either scaling the sub-carrier spacing or fewer number of OFDM symbols.

The present application introduces the following two terminologies:

Short TTI—A short transmission time interval (TTI) that is shorter than the 4G-LTE TTI. This can either contain the same number of OFDM symbols as in 4G-LTE with a higher sub-carrier spacing (e.g., 30 kHz) or utilize a smaller number of OFDM symbols (e.g., 7, 3, or 2 symbols).

Mini-slot—A mini-slot can start at any OFDM symbol and has variable length in terms of the number of OFDM symbols irrespective of the numerology.

Figure 2:
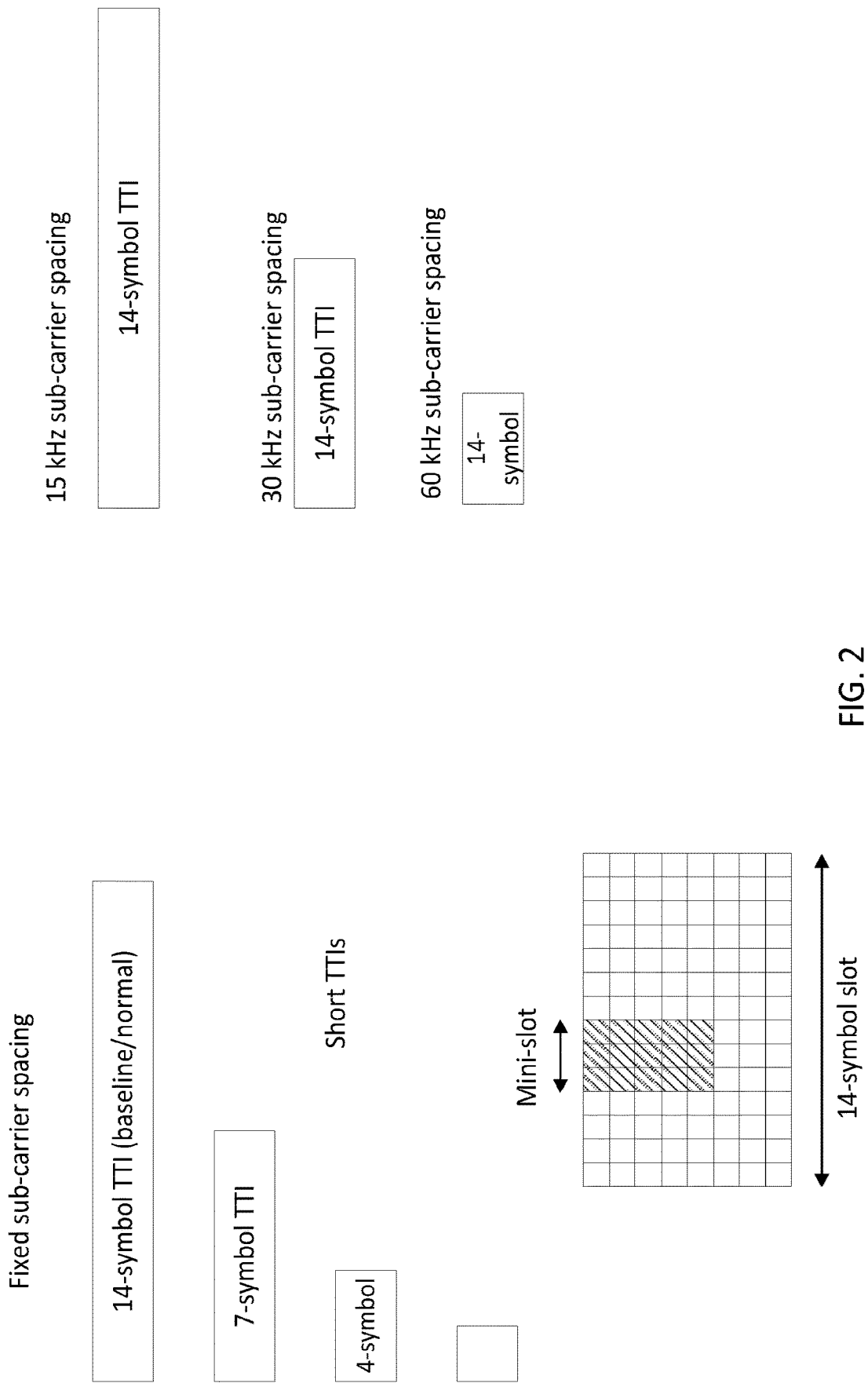
FIG. 2 shows potential transmission time intervals for fixed-carrier spacing and variable sub-carrier spacing as well as illustrating the comparative size of a mini-slot to a 14-symbol slot.

The concepts of scalable OFDM numerology, short TTI and mini-slot are illustrated in FIG. 2.

FIG. 2 shows potential TT's for fixed-carrier spacing and variable sub-carrier spacing as well as illustrating the comparative size of a mini-slot to a 14-symbol slot.

Short TT's can be achieved with fixed sub-carrier spacing by reducing the number of symbols. Equally, short TT's can be achieved by increasing the sub-carrier spacing (reducing the symbol time).

As shown on the left of the diagram, a baseline/normal TTI is illustrated as 14 symbols in length, with examples of short TT's at 7, 4 and 2 symbols length illustrated below. On the right hand side of FIG. 2, various different length short TT's are illustrated, effected by altering the sub-carrier spacing while retaining the number of symbols at 14.

On the bottom of the diagram, a mini-slot is shown, shaded in a 14 symbol slot, of across an arbitrary number of sub-carriers and across an arbitrary number of symbols.

The 14-symbol slot has 14 symbols distributed over time, and 8 sub-carriers distributed over frequency. The slot is divided into resource elements, each one being allocated a particular symbol (in the time axis) and subcarrier (in the frequency axis). Accordingly, the 14-symbol slot shown has 14×8=112 resource elements.

A slot is a predefined grouping of symbols. Each slot may be divided into a number of resource blocks, made up of the predefined grouping of symbols and a predefined range of sub-carriers. For instance, in 4G-LTE, a resource block is made up of 12 consecutive subcarriers and 7 OFDM symbols (84 resource elements).

The mini-slot is indicated through cross-hatching. The mini-slot can have any number of symbols. In the present case, three symbols are assigned to the mini-slot at the fifth symbol within the 14-symbol slot. The mini-slot is allocated five sub-carriers.

Whilst the above implementation relates to a specific implementation having specific numbers of symbols and subcarriers for the resource block and mini-slot, these can be varied between implementations.

The reader will note that the concept of short TT's is applicable to a 4G system as well; however, mini-slots are specific to a 5G system only.

Resource Allocation Technique

Figure 3:
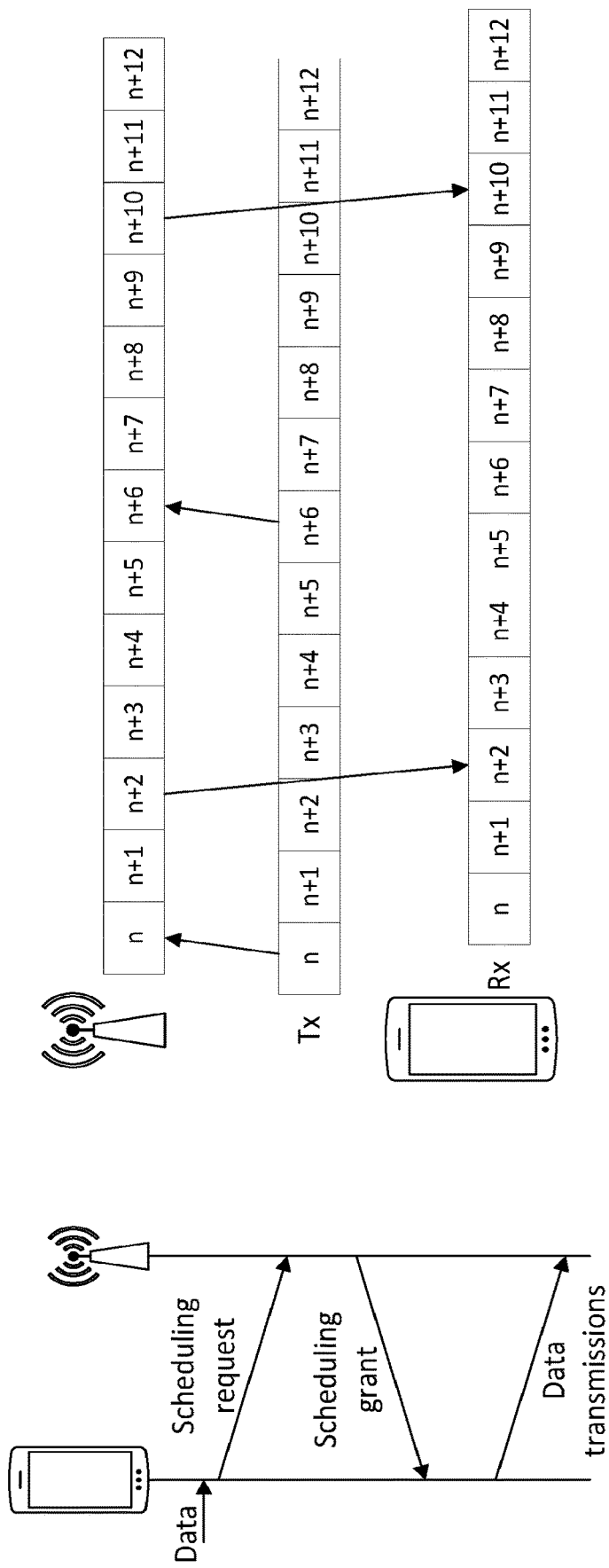
FIG. 3 shows a resource allocation procedure.

FIG. 3 shows a resource allocation procedure. This is used in 4G-LTE and 5G. In case of uplink transmission, a device or user equipment (UE) transmits a scheduling request message to the base station on the physical uplink control channel (PUCCH) at the next available opportunity, i.e., sub-frame n. The base station may be an eNodeB (eNB) or gNodeB (gNB).

Upon successful reception of the scheduling request, the base station transmits a downlink control packet containing the scheduling grant message on the physical downlink control channel (PDCCH) in sub-frame n+2. The scheduling grant contains the number and the position/location of the assigned resource blocks (RBs). The first data packet is transmitted by the UE on the physical uplink shared channel (PUSCH) at (typically) 4 sub-frames after receiving the scheduling grant.

If a UE has additional data to send (which is indicated by a buffer status report as part of the scheduling request message), the base station schedules further RBs and sends the next scheduling grant message at (typically) 4 sub-frames after receiving the first uplink transmission, i.e., sub-frame n+10. Therefore, subsequent uplink data transmissions take place every 8 sub-frames.

In case of downlink transmission, the base station dynamically schedules a UE. It transmits the downlink grant on the PDCCH which indicates the position/location of the downlink data on the physical downlink shared channel (PDCCH).

At the medium access control (MAC) layer, retransmissions are handled through a hybrid automatic repeat request (HARQ) which is a combination of forward error correction (FEC) and ARQ error control. For a downlink transmission, the device provides acknowledgement (ACK) or negative acknowledgment (NACK) on the PUCCH. For an uplink transmission, the base station provides ACK/NACK on the physical HARQ indicator channel (PHICH).

System Model

Figure 4:
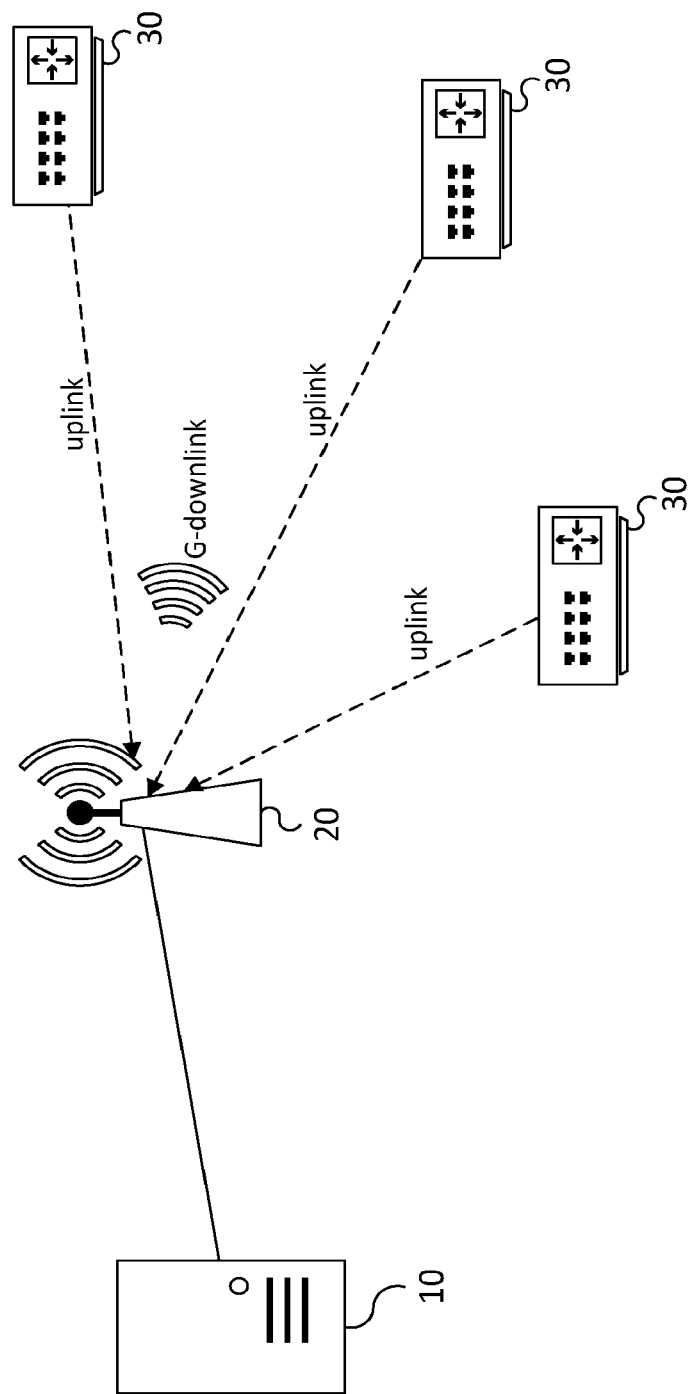
FIG. 4 shows a system model for multi-user closed-loop control according to an implementation.

FIG. 4 shows a system model for multi-user closed-loop control according to an implementation. In this implementation, a controller 10 is directly connected to a base station 20 through a wired interface. Multiple devices 30 are connected to the base station 20 through a wireless interface.

Downlink communication is communication from the base station 20 (or controller 10) to an end device 30. Uplink communication is communication from an end device 30 to the base station 20 (or controller 10). Note that whilst the base station 20 is directly connected to the controller 10 in this implementation, the base station 20 can also be connected to the controller 10 through a wireless connection.

Owing to scalable numerology, short TT's and mini-slots, a flexible frame structure can be realized wherein the time and frequency structure of sub-frames can be dynamically adjusted. The present implementations assume a baseline numerology upon which a baseline sub-frame duration, comprising an integer number of OFDM symbols, is defined. For instance, assuming a baseline numerology with 15 kHz sub-carrier spacing, a sub-frame comprising 14 OFDM symbols is 1 millisecond (ms) in duration.

A sub-frame further consists of a certain number of short TTIs. The short TT's can be defined in two distinct ways. First, short TT's can be defined with respect to the baseline numerology and consist of a fewer number of OFDM symbols. Second, short TT's can be defined in terms of fixed duration with a different OFDM numerology as compared to the baseline numerology.

Typically, one cycle of closed-loop control involves a command message from the controller, which triggers a sensory or actuation feedback from multiple devices. Therefore, a downlink transmission from the base station (controller) is assumed to precede uplink transmissions from the device(s). However, the proposed resource allocation techniques can be directly applied in the scenario of uplink transmissions preceding a downlink transmission.

One of the key aspects of multi-user Det-5G is joint downlink/uplink resource allocation. This entails joint design for both resource assignment and data transmission. Another aspect of multi-user Det-5G is self-contained allocation for handling cyclic information exchange in an optimized manner.

The fundamental design principle of multi-user Det-5G is to enable a self-contained transmission that successfully supports a cycle of information between the controller and a group of devices. Yet another aspect of multi-user Det-5G is bundled transmission wherein a transmission is repeated multiple times as dictated by a unique bundle size parameter. This is to improve the reliability of a single control or a data transmission, in order to avoid delays arising due to feedback-based retransmission techniques like HARQ at the MAC layer and ARQ at the RLC layer.

Figure 5:
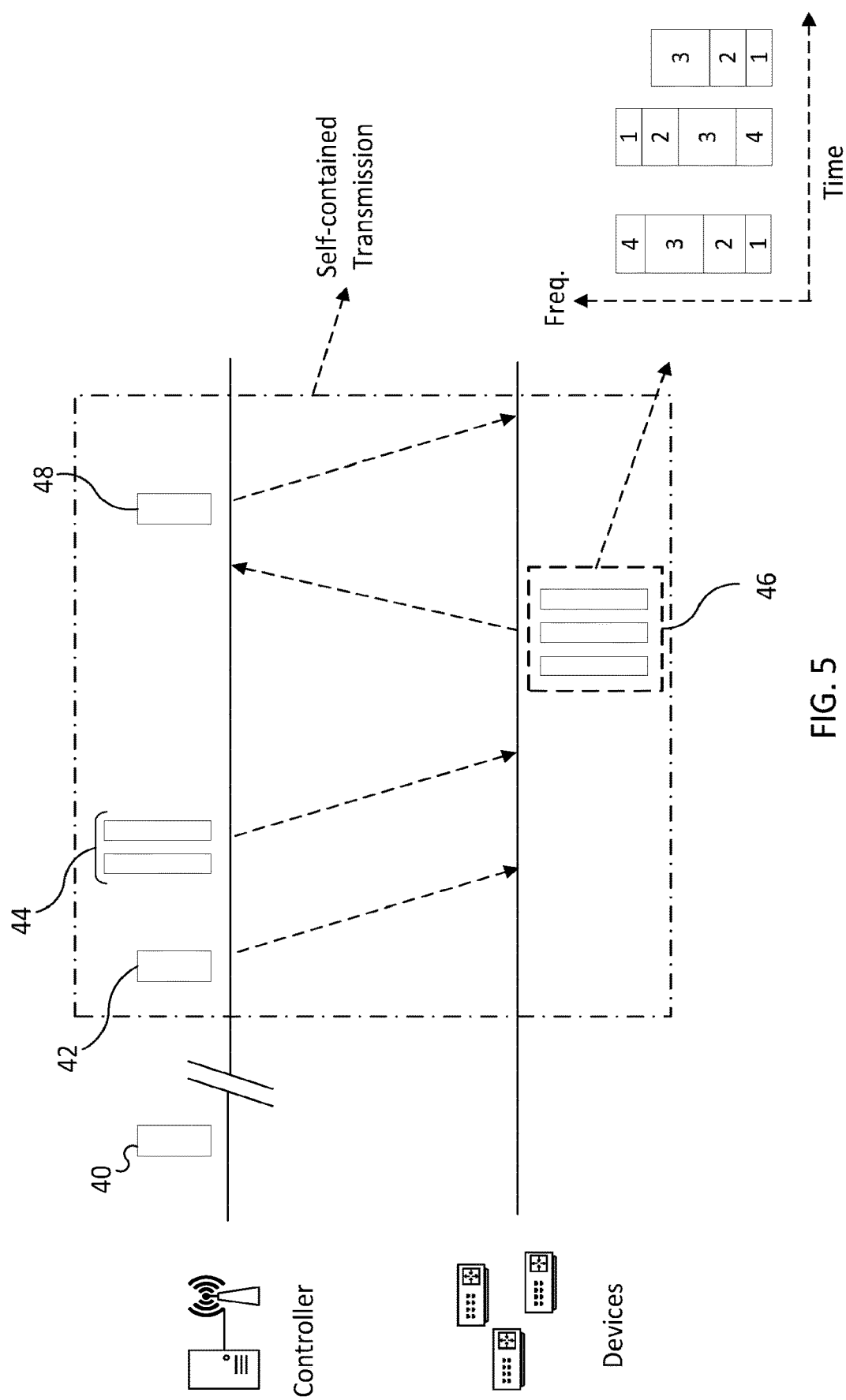
FIG. 5 illustrates resource allocation according to an implementation.

FIG. 5 illustrates resource allocation according to an implementation. This demonstrates multi-user Det-5G and the concept of a self-contained transmission for realizing multi-user closed-loop control. To realize such self-contained transmissions, devices need some grouping information 40. Creation of groups and transmission of group-related information is discussed later.

The self-contained transmission starts with a resource grant 42 sent by the controller. Unlike conventional techniques, multi-user Det-5G implements a joint downlink/uplink grant, which includes resource assignment for the downlink data transmission and resource grant for the successive uplink data transmission.

The resource grant 42 is followed by group downlink (G-downlink) data transmission(s) 44. Unlike unicast transmissions, a G-downlink transmission 44 is multicast to an entire group of devices. The G-downlink transmission 44 can be a single transmission, or it can be a bundled transmission (a group of transmissions). In the present case, the G-downlink transmission 44 is a bundle of two transmissions.

The G-downlink data transmission 44 is followed by uplink data transmission(s) 46. Similar to the downlink, transmissions in uplink can be single or bundled. In the present case, the group bundle length is 3. The uplink transmissions 46 are multi-user in nature, i.e., multiple devices transmit data in a single transmission. Allocation of resources in time/frequency domain for multi-user transmissions is discussed later.

Upon successful reception of uplink transmission(s) 46, the base station transmits a block ACK 48. The block ACK 48 is transmitted after reception of the multi-user bundled transmission 46, i.e., the base station does not transmit ACKs for individual multi-user uplink transmissions. The block ACK 48 is transmitted if the base station has successfully received data from all devices in the group. The joint downlink/uplink resource grant also allocates resources for transmission of block ACK.

In one implementation, mini-slots are used for control-plane information (signaling) while short TT's are used for user-plane (data) information.

Figure 6:
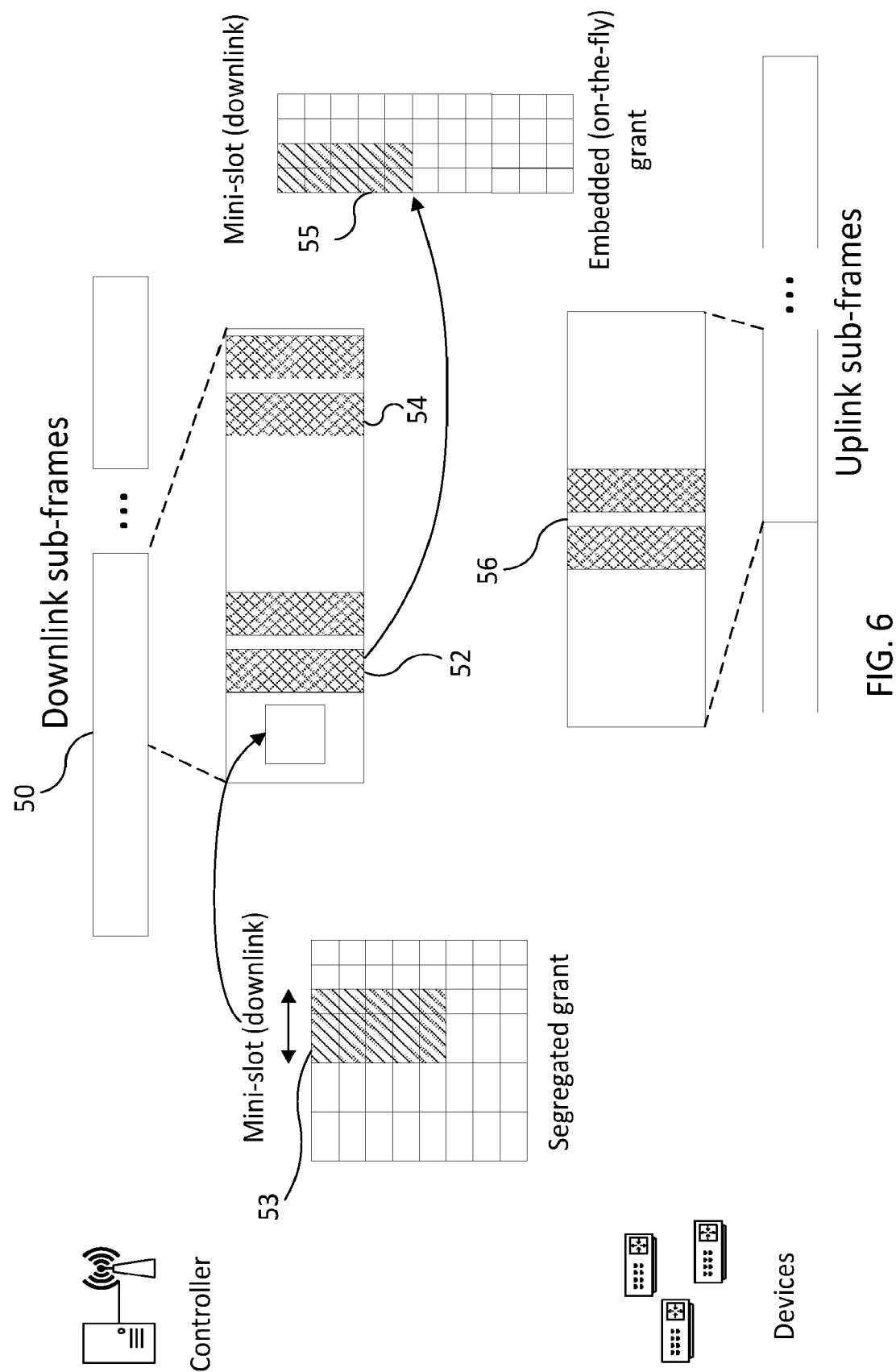
FIG. 6 illustrates self-contained transmissions aided by short transmission time intervals (TTIs) and mini-slots.

FIG. 6 illustrates self-contained transmissions aided by short TT's and mini-slots. A sub-frame (in downlink as well as in uplink) is split into multiple short TTIs. The short TT's 52 can be reserved exclusively for control-centric applications requiring low latency. Alternatively, short TT's can be merged to support bandwidth-hungry applications requiring high data rates. Short TT's and mini-slots can be used in different ways.

The controller informs the base station (through the wired interface) of its intent to start a closed-loop control application with a specific device. It is assumed that the group of devices is already in a connected state. If the devices are not in a connected state, the base station performs the necessary procedures to ensure that the devices are in a connected state. It is worth emphasizing the initial set up latency, before start of the control cycle, is not critical for the application.

The base station transmits a joint downlink/uplink grant on a mini-slot containing a short physical downlink control channel (sPDCCH). The joint downlink/uplink grant can be segregated or embedded. In the former case, the grant is transmitted by defining a mini-slot outside 53 the short TTI 52 reserved for downlink transmission (shown on the left of the Figure). In case of the latter, the grant is transmitted on-the-fly by defining a mini-slot 55 in the same short TTI 52 as reserved for downlink transmission (shown on the right). Both types of grants are illustrated in FIG. 6.

The base station also computes an appropriate bundle length for the G-downlink transmission 50 and resource allocation information for the multi-user bundled uplink transmission 56. These aspects are discussed later.

Information related to bundled transmissions is sent in the grant message. Following the transmission of grant message, data transmissions in downlink and uplink take place in the short TTIs, i.e., through PDSCH and PUSCH, respectively. A transmission in either downlink or uplink is repeated in adjacent TT's as dictated by the bundle length.

Upon successful reception of the multi-user uplink transmission 56, the base station transmits a block ACK 54 on a short physical HARQ indicator channel (sPHICH) which is defined on a mini-slot. The base station allocates resources for this block ACK 54 in the joint downlink/uplink grant. The block ACK 54 is a single ACK for all users of the multi-user transmission.

Figure 7:
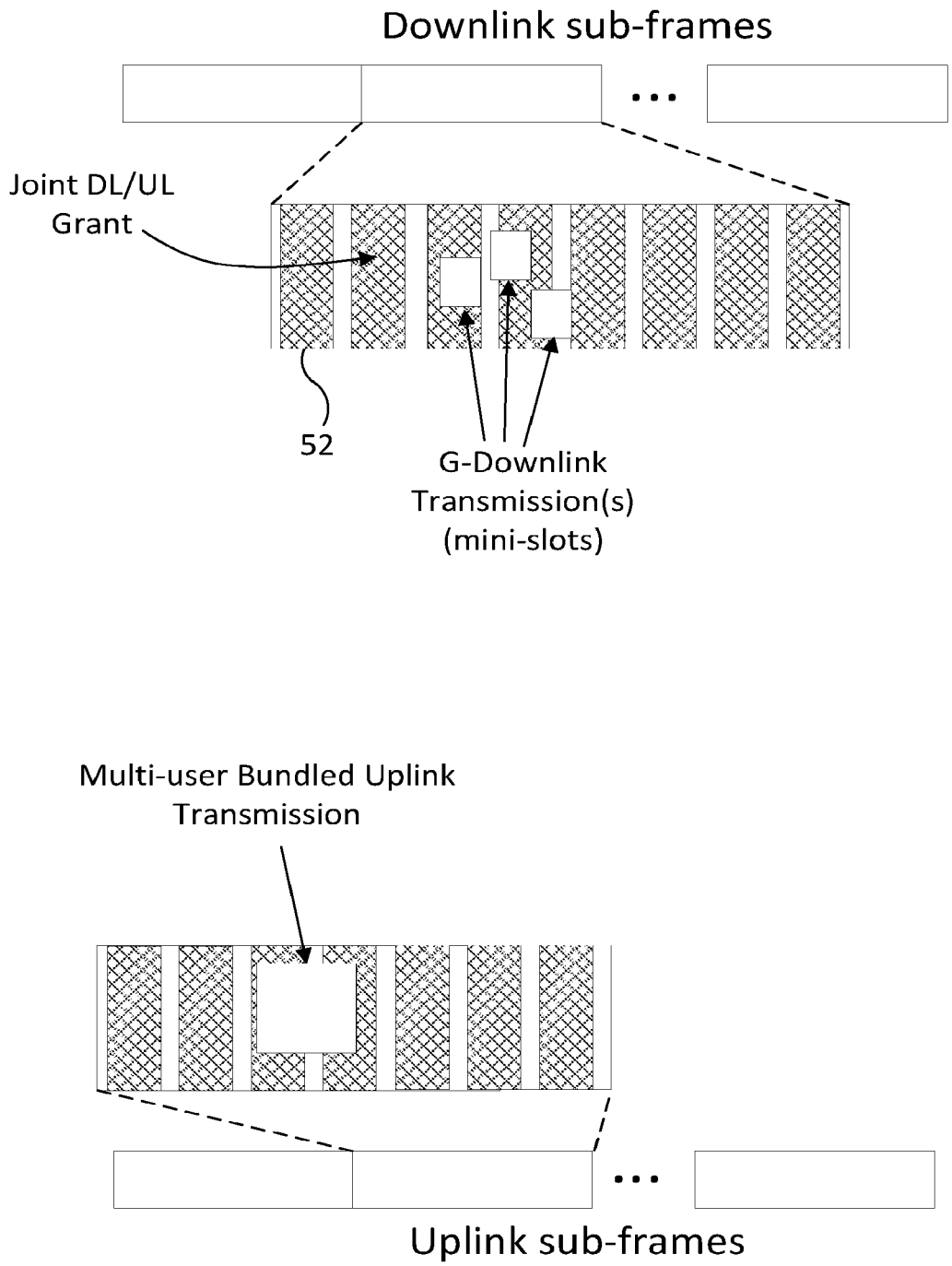
FIG. 7 shows an alternative implementation in which mini-slots are used for user-plane information while short TT's are used for signaling (control-plane) information.

FIG. 7 shows an alternative implementation in which mini-slots are used for user-plane information while short TT's are used for signaling (control-plane) information. Such an approach further reduces latency as data transmissions do not have to wait for short TT's as a mini-slot can start at symbol boundary. Moreover, the use of short TT's for control-plane information provides flexibility in terms of physical control channel design. The use of mini-slots for user-plane information requires some optimization in the uplink, in terms of finding the optimal mini-slot size in time and frequency domains. Such optimization is discussed later.

In some implementations, the self-contained transmissions are repeated to achieve higher reliability. A self-contained transmission can be unsuccessful if an uplink transmission from any device has failed or if an uplink transmission was not performed by the device due to a downlink transmission failure. The latter scenario is applicable to downlink-triggered closed-loop control applications. Upon detecting a failure from any device in a self-contained transmission, the base station replaces the block ACK with a new joint downlink/uplink grant for repeating the self-contained transmission.

G-Downlink Transmissions

The G-downlink transmissions are multicast in nature and sent to a group of devices. Multi-user Det-5G implements multicast transmissions through PDSCH. Conventionally, PDSCH contains data for unicast transmissions. Each device/user is identified by a unique cell radio network temporary identifier (C-RNTI). The data for a user is scrambled based on C-RNTI. Therefore, a user cannot decode data for others.

Multi-user Det-5G implements a group RNTI which identifies a group of devices. Therefore, a group of devices can decode data transmissions in a PDSCH based on a group RNTI.

For the sake of group creation, two scenarios are considered herein. In a first scenario, there is pre-defined grouping of devices, e.g., if the devices are operating in static or quasi-static environments. In a second scenario, groups are created on-the-fly. This is attractive for operation in dynamic environments. On-the-fly group creation provides design simplification in terms of optimizing bundle size for downlink and uplink transmissions.

In some implementations, on-the-fly grouping is extended to repetition of self-contained transmissions. Upon detecting a transmission failure from a device in either downlink or uplink, the base station transmits a joint downlink/uplink grant that allocates resources for a group of devices with a transmission failure in the first self-contained transmission.

In some implementations, bundled G-downlink transmissions can be exploited to achieve a HARQ-like functionality, termed as proactive HARQ, without incurring the overhead and latency of conventional HARQ. The proactive HARQ functionality can be achieved in three distinct cases. In one case, each element of a bundled transmission contains data and forward error correction (FEC) information. In second case, some elements of a bundled transmission contain data while others contain FEC information. In third case, each element of a bundled transmission contains a varying amount of FEC information pertaining to the same data transmission.

Optimization of Bundled Transmissions for Downlink

Optimization of bundled transmissions is an important issue as it directly impacts reliability and resource utilization.

Figure 8:
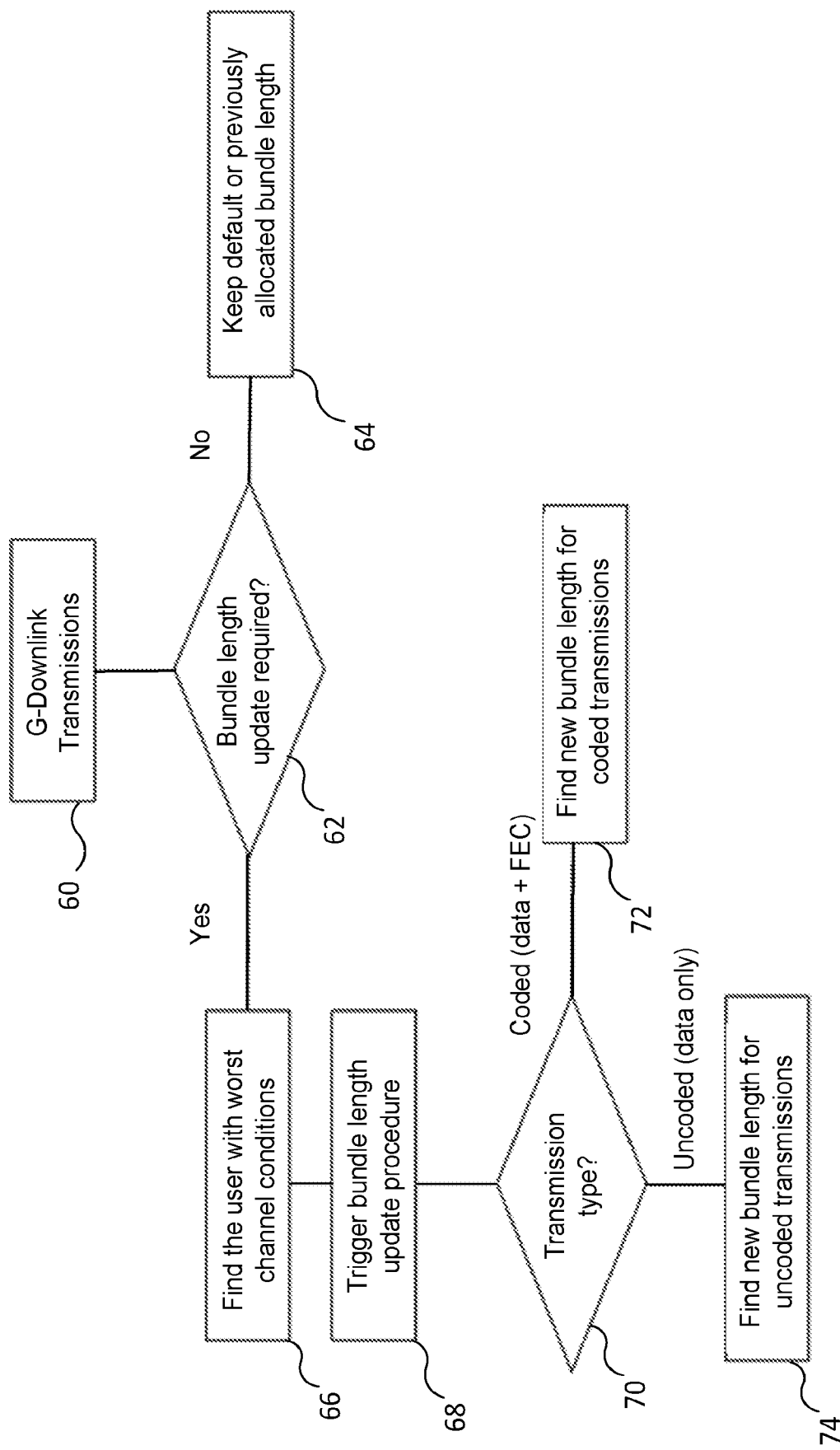
FIG. 8 shows a flowchart for a method of determining bundle length for downlink transmissions according to an implementation.

FIG. 8 shows a flowchart for a method of determining bundle length for downlink transmissions according to an implementation. The method starts when a G-downlink transmission is scheduled 60. The method then determines whether a bundle length update is required 62. If not, then the default, or previously allocated, bundle length is used for the transmission 64. If a bundle length update is required, then the bundle length is updated.

Multi-user Det-5G implements a unique approach to determine bundle length for G-downlink transmissions, i.e., the number of transmission repetitions. The proposed approach relies on received signal strength indicator (RSSI) information (an estimate of received power). The RSSI information is available during the initial connection setup phase; however, such information might be outdated for cyclic information exchange. Accordingly, at the beginning of cyclic exchange, a default bundle length is selected for G-downlink transmissions. The bi-directional information exchange provides the capability of acquiring up-to-date RSSI information through the reporting by devices of the RSSI for received downlink transmissions. The present methodology assumes that a device piggybacks downlink RSSI information on the uplink data transmissions, although this could be separately reported through separate transmissions.

In one implementation, the objective of the downlink bundle length adaptation procedure is to fulfil a target signal-to-interference-plus-noise-ratio (SINR) requirement at the receiver (device). For each device, the base station maintains a moving average for RSSI of K previous downlink transmissions, which is denoted by RSSI_K. For each device, it also computes the mean RSSI and the RSSI variance based on the most recent bundled transmission, denoted by RSSI_avg and RSSI_var, respectively.

The decision to adapt the bundle length 62 is based on the following condition:
if (RSSI_avg<RSSI_thresh) [for the device with the worst RSSI]
OR
(RSSI_avg<RSSI_K) [for all devices]
OR
(RSSI_var>RSSI_thresh_var) [for all devices]
where RSSI_thresh is the threshold RSSI for fulfilling a certain SINR requirement at the device and RSSI_thresh_var is the threshold RSSI variance.

If the above condition is satisfied, then the system determines that a bundle length update is necessary. In this case, the end device with the worst channel conditions (e.g. worst RSSI) is identified 66 and the bundle length update procedure is triggered 68 based on the channel conditions for the downlink transmissions to the identified end device.

As mentioned earlier, there can be different scenarios for downlink bundled transmission in terms of transmitting data and FEC information. Accordingly, the next step is to determine the transmission type that is being applied 70.

Two types of bundled transmissions are considered: coded transmissions and uncoded transmissions. If coded transmissions are being used, a new bundle length is determined for coded transmissions 72. If uncoded transmissions are being used, a new bundle length is determined for uncoded transmissions 74. Once the bundle length has been determined, the transmission is sent according to the determined bundle length.

In case of coded transmissions, each additional element of a bundled transmission provides a gain that is based on the coding rate. The signal-to-noise ratio (SNR) of the $i^{th}$ transmission of the bundle is given by:

$$SNR(i) = SNR\_single + SNR\_gain(i),$$

where SNR_single denotes the SNR of a single transmission and SNR_gain is a function of coding rate.

Similar relations can be extended to the case of uncoded transmissions; however, the SNR_gain of the $i^{th}$ transmission of the bundle is determined by the SNR versus transmission failure probability relationship. The probability of transmission failure for each transmission can be determined based on the SNR for corresponding downlink transmissions. With multiple transmissions, then the failure probability is given by the multiple of the probabilities for the individual transmissions. A gain is provided since the failure probability for a given SNR would be lower.

In either case, the system is able to determine the expected signal to noise ratio (SNR) for a given bundle size based on the SNR for a single previous bundled transmission and the expected gain provided by increasing the bundle size. In either case, the gain can be determined, for instance, via a predefined function for gain relative to bundle size.

The bundle length adaptation algorithm is shown in Table 1. The algorithm adopts an iterative approach and finds the appropriate bundle length that fulfils the target SINR requirement in downlink for the device with the worst RSSI.

TABLE 1

Bundle length adaptation algorithm for G-downlink Transmissions

Input parameters
SNR_thresh (threshold SNR); RSSI_thresh (threshold RSSI); RSSI_avg (mean RSSI of the bundle); Int_Margin (interference margin); Max_Length (maximum bundle length); Bundle_previous (previous bundle length)
Start procedure (downlink_bundle_length_update)
Find the device/user with the worst RSSI
    Set RSSI_single = RSSI_avg; Calculate SNR_single from RSSI_single; Set SNR_bundle = SNR_single; Set Bundle_length = Bundle_previous
        while (SNR_bundle < SNR_thresh + Int_Margin) OR Bundle_Length = Max_Length TABLE 1-continued Bundle length adaptation algorithm for G-downlink Transmissions

```
            Bundle_Length = Bundle_Length + 1;
            Calculate SNR_bundle with Bundle_Length
            if SNR_bundle > SNR_thresh + Int_Margin
                break
            end if
        end while
end procedure
```

The method begins with the identification of the device with the worst RSSI. As the downlink communication is multi-cast, the bundle size is defined by the worst received signal strength. This RSSI is measured by the receiving device with respect to downlink communications and reported back to the base station for the purposes of determining bundle size. The device with the worse RSSI might be the device with the lowest average RSSI across the most recently transmitted bundle. Alternatively, this lowest average RSSI might be taken across a predefined number of previously transmitted bundles. Where the there is only a single recipient in the group (e.g. where minimum bundle size is being determined for uplink transmissions, as discussed later), this step is skipped.

The method then continues to determine the downlink bundle length for the selected device. The method sets the current signal strength for a single transmission (RSSI_single) to be equal to the average RSSI over the most recent bundled transmission. The signal to noise ratio (SNR) for this single transmission (SNR_single) is determined from RSSI_single. This is achieved by adding the noise value for the transmission to the RSSI (the signal value).

The bundle length is then iteratively increased. Each time the bundle length is increased, the expected signal to noise ratio is determined based on the expected gain from the updated bundle length (as discussed above). If the expected SNR is greater than a predetermined threshold (in this case equal to a SNR threshold plus an interference margin) then the updated bundle length is set to the optimum bundle length for downlink transmission. If not, then the bundle length is increased again.

In some implementations, the bundle length adaptation algorithm further considers the gain due to power adaptation, i.e., increasing the transmit power of downlink/uplink transmissions for a certain bundle length.

Note that the bundle length adaptation procedure caters for both grouping scenarios, i.e., pre-defined grouping or on-the-fly grouping. In the case of the latter, the algorithm can be directly applied with a single RSSI value that reflects the RSSI for the entire group.

As discussed below, the bundle length adaptation methodology described above can also be applied to determine an optimum bundle length for uplink transmissions. In this case, the methodology is the same; however, there is no need to identify a device having a minimum RSSI (as only one receiving device is present—the base station) and the RSSI values used are those detected at the base station from uplink transmissions.

Optimization of Multi-User Bundled Uplink Transmission Based on Short TTIs

The objective of optimizing multi-user bundled uplink transmissions is to find an optimal or near-optimal bundle size in time and frequency domains. The present application distinguishes two scenarios for optimizing multi-user bundled uplink transmissions: based on the use of mini-slots, and based on the use of short TTIs.

In one implementation (described earlier), short TTIs are used for data transmissions. In this case, the optimization framework targets an optimal bundle length in time domain while accounting for resource constraints in the frequency domain.

Owing to the use of short TTIs, the present implementation considers resource blocks (RBs) comprising a fixed number of OFDM symbols in the time domain and a fixed number of sub-carriers in the frequency domain. In 5G, the size of each RB in the time domain is fixed by the protocol (each RB must have the same length in time). Nevertheless, the RBs can have variable size in the frequency domain (a varying number of subcarriers). Equally, in 5G the size of the short TTIs is set by the protocol. Each short TTI will be a set number of resource blocks in the time domain and a set number of resource blocks in the frequency domain (for instance, two RBs in the time domain and eight RBs in the frequency domain).

The RB represents a minimum time allocation unit for a user. The optimization problem is formulated as follows:

$$\text{Min}_{(N_{RBs}, N\_TTI)} \text{GBL}$$
$$\text{subject to}$$
$$BL_m \geq BL_{min}$$
$$SNR_m \geq SNR\_T$$

The objective function aims to minimize the group block length (GBL) subject to fulfilment of a minimum bundle length ($BL_{min}$) and a threshold SNR (SNR_T) for a device m. The optimization is conducted over the number of available RBs (N_RBs) and the number of short TTIs (N_TTIs).

Owing to the complexity of the optimization problem, a heuristic algorithm is proposed, as shown in Table 2.

TABLE 2

Optimization of multi-user bundled uplink transmissions (short TTIs)

Input parameters
SNR_T (threshold SNR); Set_N_RBs (set of RBs); Q (set of modulation and coding schemes);
Set_Payload (Set of net payload for each device);
Start procedure (individual bundle length)
Find optimized bundle length $BL_{min}$ for each device based on Algorithm 1

TABLE 2-continued

Figure 9:
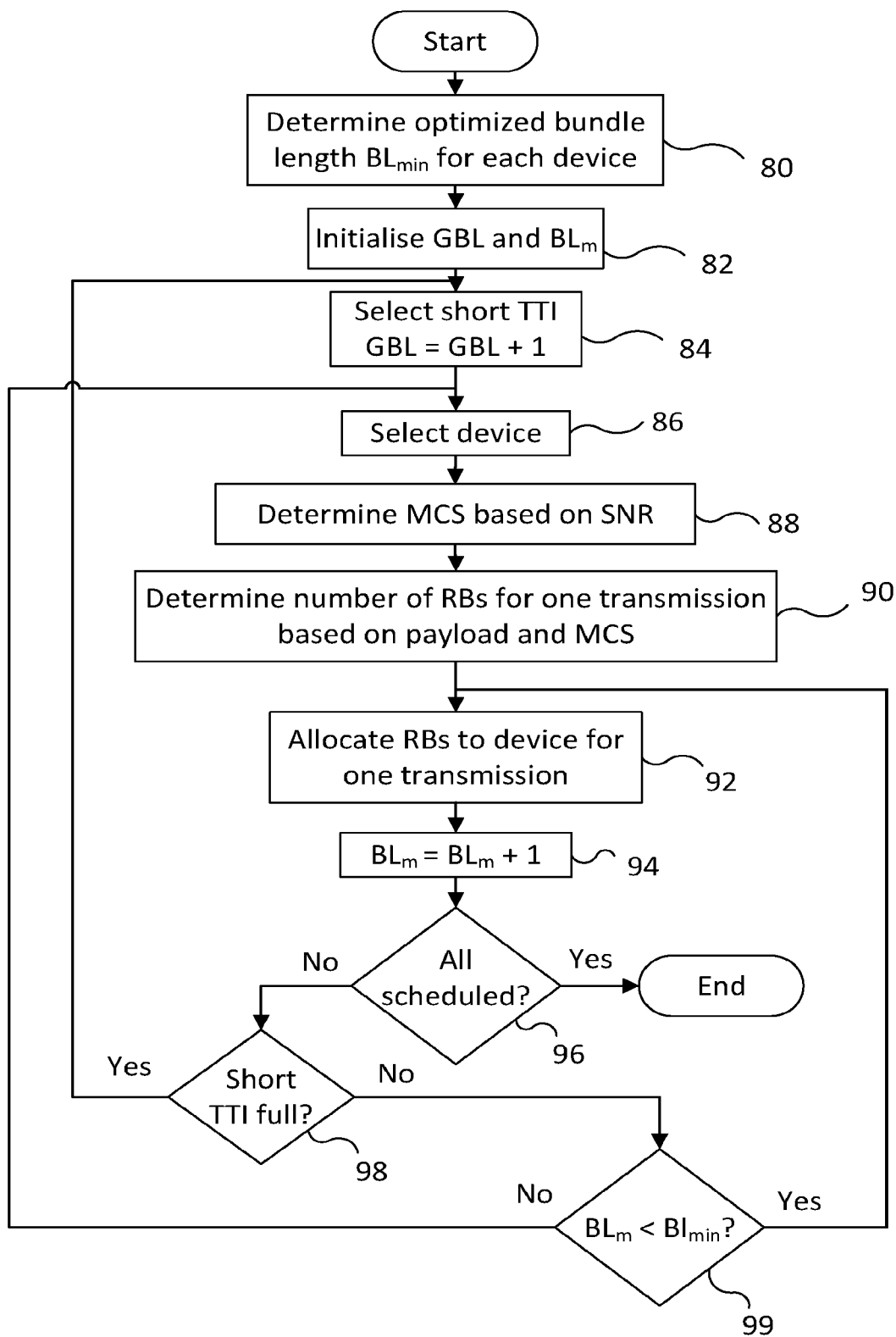
FIG. 9 shows a method for allocating resources for uplink transmissions across short TT's according to an implementation.

Optimization of multi-user bundled uplink transmissions (short TTIs)

end procedure
Start procedure (optimized group bundle length)
    Set GBL = 0; Set $BL_m$ = 0; Sort (descending) devices based on SNR
        while ($BL_m < BL_{min}$ for any device m)
            GBL = GBL + 1
                while (Set_N_RBs is not empty)
                Map SNR_m to Q;
                Allocate appropriate number of RBs to device m
                $BL_m = BL_m + 1$;
            end while
        end while
end procedure FIG. 9 shows a method for allocating resources for uplink transmissions across short TT's according to an implementation. The algorithm relies on finding an optimal bundle length ($BL_{min}$) for each device. This is important for meeting the SNR requirements for a device.

Accordingly, the method starts with the determination 80 of the optimized bundle length $BL_{min}$ for each device. This is computed based on the algorithm for G-downlink transmissions based on the channel conditions of a single device.

With reference to Table 1, the uplink bundle length for a device is determined using the RSSI detected by the base station for the previous uplink transmission from the device. There is no need to determine a device having a minimum RSSI as there is only a single recipient for uplink transmissions (the base station), although this could be implemented where communications with multiple base stations are required.

The global block length (GBL) and individual block lengths for each device ($BL_m$) are then initialized to zero 82. The iterative aspect of method then begins.

In summary, each iteration optimizes resource allocation for a single short TTI. Each device may require a variable number of RBs depending on its net payload requirements. The net payload requirements are dictated by higher-layer payload, header overheads and FEC information.

Based on the allocated modulation and coding scheme (MCS), a device is allocated an appropriate number of RBs. The algorithm continues until the individual block length requirement for a device is fulfilled. The GBL value is incremented once the capacity of a short TTI is exhausted.

In more detail, the iterative aspect of the method starts by selecting a short TTI and the incrementing the global block length (GBL) by one 94. The method prioritizes allocation of earlier short TTIs, starting at the earliest short TTI and moving forward in time.

A device is then selected for the allocation of resource blocks (RB) 86. In the present implementation, the devices are sorted in descending order of signal to noise ratio (SNR), with the device with the highest SNR being selected first. The SNR values are calculated by the base station based on the RSSI and noise for uplink transmissions from the respective devices.

The appropriate modulation and coding scheme (MCS) for the device is determined based on its SNR 88. For higher SNR, a higher coding rate can be used as fewer coding bits are required to successfully transmit the message. Conversely, for lower SNR a lower coding rate can be used as more coding bits are required to successfully transmit the message due to the additional noise. The modulation and coding scheme can be determined based on a predefined mapping of SNR ranges to modulation and coding schemes.

The number of resource blocks (RBs) required to send a single transmission are determined based on the payload and the modulation and coding scheme 90. For instance, for a payload of size 1 RB, with a coding rate of 0.5, 2 RBs would be necessary.

The required number of RBs are then from the available RBs from available short TT's 92. This therefore allocates a single transmission within a bundle. Allocation favors available RBs at lower frequencies and earlier times.

After allocation of resource blocks for the device, the counters for the global bundle length (GBL) and the bundle length for the device ($BL_m$) are each increased by one 94, as a single transmission has been allocated.

The method determines whether all required transmissions are scheduled 96. This includes determining whether the minimum bundle length has been satisfied for each device that is to transmit data. If so, then the method ends. If not, then the method continues to schedule the next transmission.

To schedule the next transmission, the method then determines whether selected short TTI is full 98. That is, the method determines whether the short TTI has any available unallocated RBs, or at least sufficient unallocated RBs for the scheduling of another transmission within the short TTI. If the short TTI is full, then the method loops back to step 84 to select the next short TTI.

If the short TTI is not full, then the method determines whether the bundle length for the device is less than the minimum bundle length for the device 99, $BL_m < BL_{min}$. If so, then the method loops back to step 92 to allocate RBs for another transmission. If not, then the method loops back to step 86 to select the next device.

It should be noted that the flow-chart of FIG. 9 is merely an example, and that the steps may be rearranged as appropriate for various implementations. For instance, whilst step 98 (the determination of whether a short TTI is full) is included after a determination of whether all transmissions are scheduled, this condition may be applied at any point, including during the allocation of RBs to a device for one transmission (step 92). That is, if the short TTI becomes full during the allocation, with more RBs due to be allocated, then the next short TTI may be selected and the GBL counter may be incremented before continuing the allocation for the transmission using RBs from the next short TTI.

Accordingly, the method iteratively allocates RBs to each device, in order of descending SNR, prioritizing short TT's at earlier positions within the frame. When a short TTI is filled, the method moves on to the next short TTI and increments the GBL counter. Each time a full transmission is scheduled, the individual block length for the device is incremented. Once the minimum (optimum) block length for a device has been reached, the next device is scheduled.

Optimization of Multi-User Bundled Uplink Transmission Based on Mini-Slots

In a second implementation, mini-slots are used for data transmissions. Since a mini-slot has a variable length, each mini-slot is divided into a variable number of resource elements (REs) across and time and frequency domains. Each RE comprises a fixed number of OFDM symbols in the time domain and a fixed number of the sub-carriers in frequency domain (e.g. one symbol in the time-domain and one sub-carrier in the frequency domain), although the resource elements can be any length and height. Accordingly, unlike resource blocks, the size of resource elements is not defined by the wireless protocol.

A mini-slot for a user is characterized by a fixed number of REs. The objective of the optimization framework is to find the optimal or near-optimal size of a multi-user bundled mini-slot. This optimization problem is formulated as follows:

$$\text{Min}_{(N_{REs})} \text{MSL}$$
$$\text{subject to}$$
$$BL_m \geq BL_{min}$$
$$SNR_m \geq SNR\_T$$

The objective function aims to minimize the bundled mini-slot length (MSL) in both the time and frequency dimensions, subject to fulfilment of a minimum block length ($BL_{min}$) and a threshold SNR SNR_T for a device m. The optimization is conducted over the number of available REs (N_REs).

Owing to the complexity of the optimization problem, this is implemented via a heuristic algorithm, as shown in Table 3.

Next, the algorithm implements an iterative approach. Each iteration optimizes resource allocation for mini-slots pertaining to a device.

The transmission time for each device $T_m$ is determined 102 based on the coding scheme and the amount of data to be sent (the payload). The mini-slot length in time domain is dictated by the product of its bundle length and its transmission time (for a single transmission). The maximum transmission time is given by $T_s$.

Each device may require a variable number of RBs depending on its net payload requirements. Each device may send variable payload, and therefore may have a varying transmission time. The net payload requirements are dictated by higher-layer payload, header overheads and FEC information. Accordingly, the transmission time is based on the allocated modulation and coding scheme (MCS). As with the method of FIG. 9, the MCS is assigned based on the SNR for the given device.

After transmission times have been determined, a device is selected 106 and transmissions for the device are scheduled 108 within the mini-slot. The base station sorts devices in descending order based on their respective transmission times. As the devices are sorted in descending order of transmission time, the device with the longest transmission time is selected first.

After scheduling a device, the base station determines whether the mini-slot has been filled, i.e., whether the maximum transmission time $T_s$ for the mini-slot has been reached. To do this, the base station computes the remaining transmission time with reference to $T_s$. If the available transmission time is sufficient, one or more transmissions for another device are scheduled 110. This other device may be the next device to be scheduled.

Afterwards, the set of devices to be scheduled and the set of transmissions for each device are updated.

TABLE 3

Optimization of multi-user bundled uplink transmissions (mini-slots)

Figure 10:
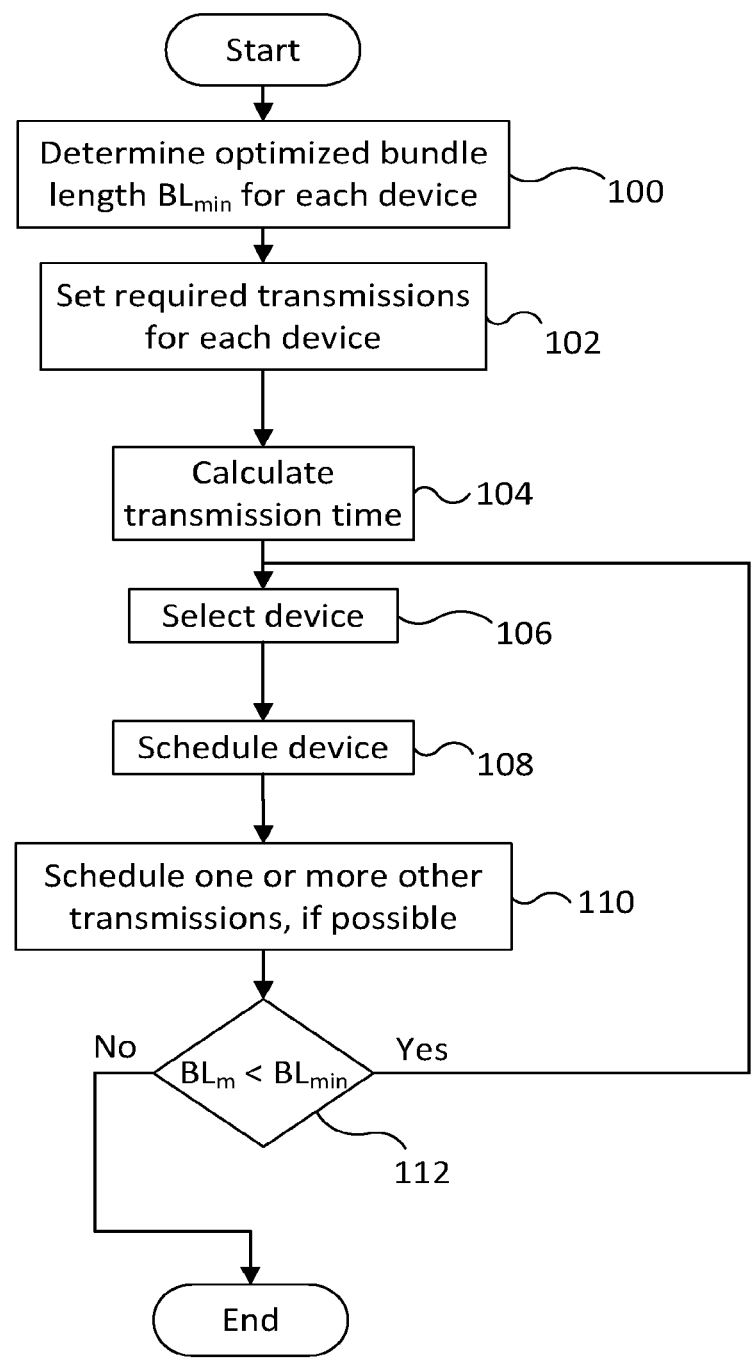
FIG. 10 shows a method for allocating resources for uplink transmissions across a mini-slot according to an implementation.

Input parameters
SNR_T (threshold SNR); Set_N_RBs (set of RBs); Q (set of modulation and coding schemes);
Set_Payload (Set of net payload for each device);
Start procedure (individual bundle length)
Find optimized bundle length $BL_{min}$ for each device based on Algorithm 1
Define Set_Txn (Set of required transmissions for each device) based on $BL_{min}$ for each device
end procedure
Start procedure (optimized mini-slot length)
Map SNR_m to Q; Define Set_D (Set of devices to be scheduled)
Calculate transmission time for each device ($T_m$)
Set $BL_m = 0$; Sort (descending) devices based on $T_m$
    while ($BL_m < BL_{min}$ for any device m)
        Allocate appropriate number of RBs to device m
        Schedule device m
        Schedule device n (n ≠ m) if a transmission opportunity exists
        Update Set_D; Update Set_Txn;
    end while
end procedure FIG. 10 shows a method for allocating resources for uplink transmissions across a mini-slot according to an implementation.

The method begins by first finding an optimal bundle length for each device 90, i.e., an optimal number of mini-slots for bundled transmission. This is important for meeting the SNR requirements for a device. This is computed based on the algorithm for G-downlink transmissions based on the channel conditions of a single device.

The method then determines 112 whether any of the devices require any further resource blocks to meet the minimum number of resource blocks ($BL_{min}$). To do this, the method checks whether, for all devices, $BL_m < BL_{min}$. If so, then the method loops back to step 106 to select the next device and allocate transmissions. If not, then the allocation of uplink resources ends. Accordingly, the algorithm continues until the individual block length requirement for each device is fulfilled. If all of the available resources for a mini-block have been allocated, but additional transmissions still need to be scheduled, the method makes use of resources in the next available miniblock in the frame.

The method prioritizes assigning RBs that are earlier in time and lower in frequency. Accordingly, the method builds up a schedule running from earlier times and lower frequencies to later times and higher frequencies.

Whilst the method of FIG. 10 shows opportunistic scheduling at step 110, this step may be omitted and/or replaced with later scheduling. For instance, this step may be omitted in favor of filing in any potential gaps at a later point (allocating free space where available during the allocation of resources for a given device, step 108).

Figure 11:
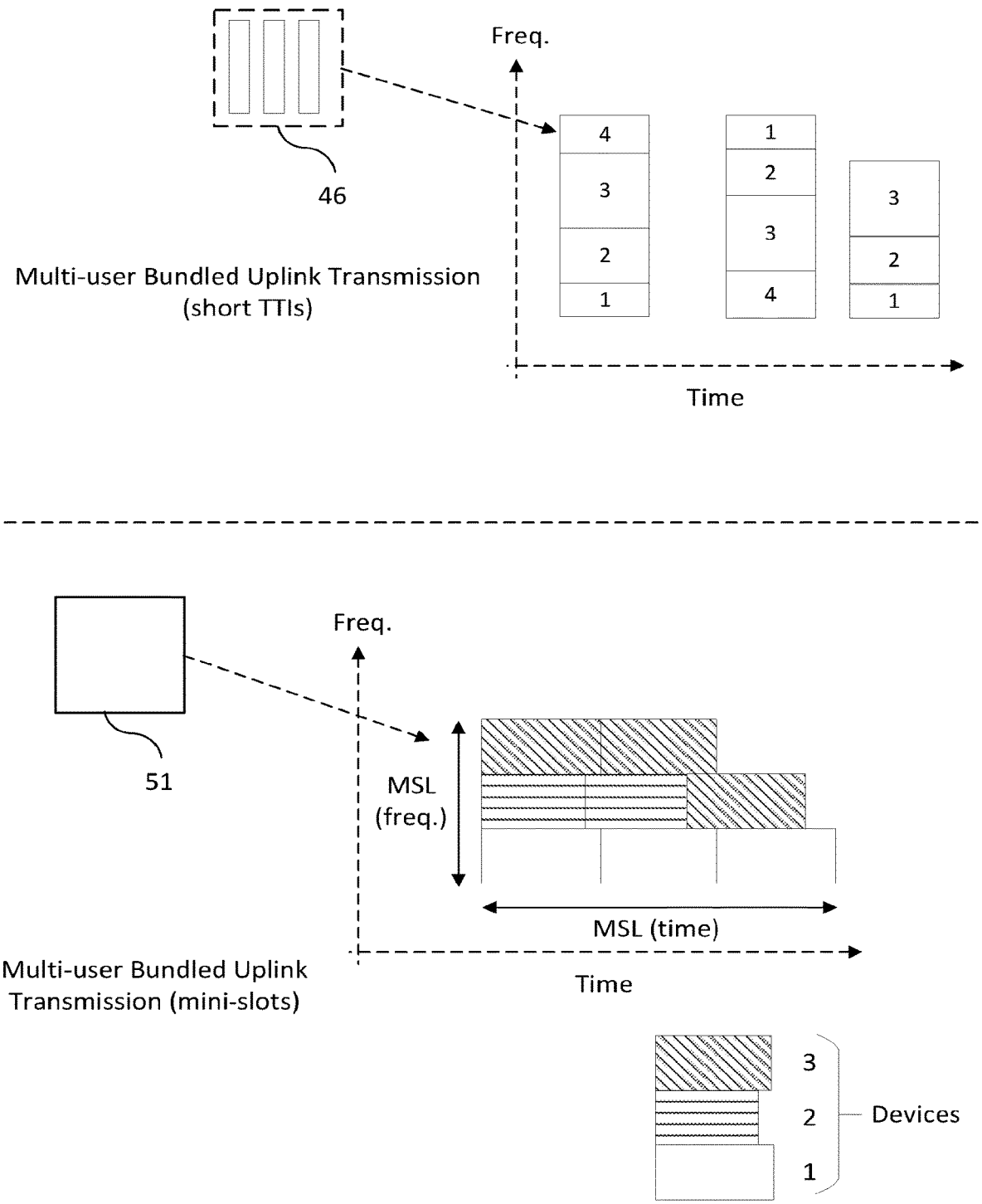
FIG. 11 illustrates optimization of multi-user bundled uplink transmissions based on short TT's and mini-slots.

FIG. 11 illustrates optimization of multi-user bundled uplink transmissions based on short TTIs and mini-slots. The top half of FIG. 11 illustrates short-TTI allocation whereas the bottom half indicates mini-slot allocation.

As shown in the top half of FIG. 11, the uplink transmissions 46 are distributed between across short TTIs (in this case, three short TTIs), with the transmissions for each device being spread across a selection of the short TTIs.

With regard to the bottom half of FIG. 11, the uplink transmission is grouped into a single mini-slot 51 which is allocated a mini-slot (MSL) frequency and time according to the above discussed methodology. The mini-slot is a single contiguous range of time and frequency (sub-carriers). In this case, three resource blocks are required for a first device, two resource blocks for a second device, and three resource blocks for a third device.

In the allocation method of Table 3, device 1 can be allocated three resource blocks within the maximum MSL time, so these are assigned to a single sub-carrier. For device two, the two required resource blocks can be allocated to the second sub-carrier, with additional space for a further resource block on that sub-carrier within the maximum MSL time. Accordingly, a third resource block on that sub-carrier is opportunistically assigned to the next device (the third device). Finally, the remaining two blocks for the third device are assigned to the third sub-carrier.

While the reader will appreciate that the above implementations are applicable to base stations (or access points) used to facilitate the connection of user devices to a wireless network, the scheduling and network management features described herein can be equally be implemented by a computing system connected to the base station (e.g. the controller 10 of FIG. 4). Accordingly, the methods described herein may be implemented on any appropriate computing system that is in communicative connection to a base station, or by the base station itself.

Figure 12:
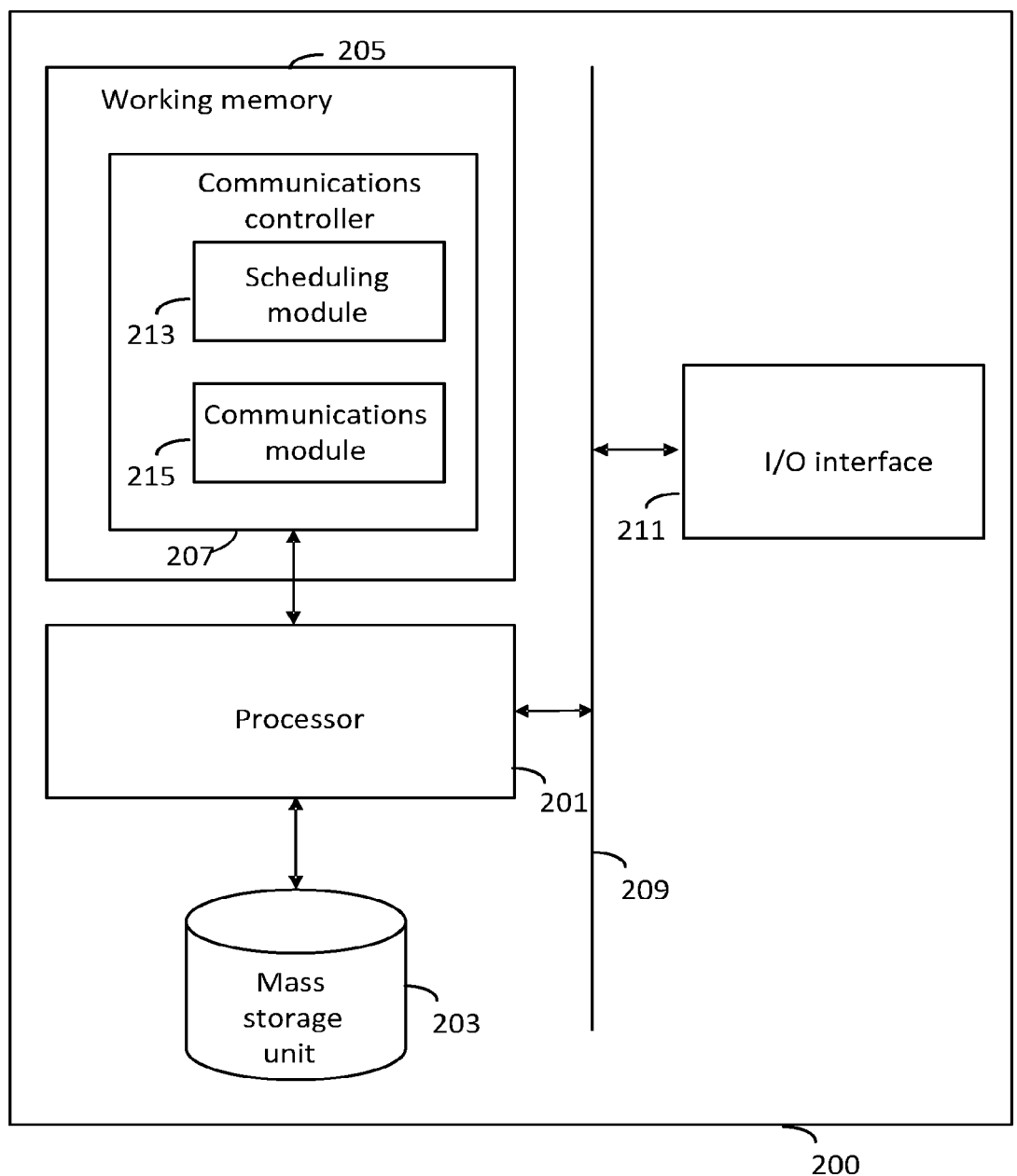
FIG. 12 shows a computing system according to an implementation.

FIG. 12 shows an example of a computing system, which provides means capable of putting an implementation, as described herein, into effect. This may be a controller 10 or a base station 20 as shown in FIG. 4 or any other form of computing device.

As illustrated, the computing system 200 comprises a processor 201 coupled to a mass storage unit 203 and accessing a working memory 205. As illustrated, a communications controller 207 is represented as a software product stored in working memory 205. However, it will be appreciated that elements of the communications controller 207 may, for convenience, be stored in the mass storage unit 203.

Usual procedures for the loading of software into memory and the storage of data in the mass storage unit 203 apply. The processor 201 also accesses, via bus 209, a communications unit (input/output interface) 211 that operates to effect communications with the wireless network. Typically, the communications unit 211 comprises one or more antennas to act as a transmitter and receiver for establishing a communications link with devices and/or other nodes in the network.

The communications controller 207 includes a scheduling module 213 and a communications module 215. The scheduling module 213 is configured to schedule transmissions by assigning resources for uplink and downlink communications as described herein. The scheduling module monitors the transmission success and received signal strength for each uplink and downlink transmission, calculates optimum bundle size, and assigns wireless resources according to the methodology described herein. The communications module 215 controls the transmission and receipt of communications over the wireless interface according to the determined schedule.

The communications controller software 207 can be embedded in original equipment, or can be provided, as a whole or in part, after manufacture. For instance, the communications controller software 207 can be introduced, as a whole, as a computer program product, which may be in the form of a download, or to be introduced via a computer program storage medium, such as an optical disk. Alternatively, modifications to an existing communications controller 207 can be made by an update, or plug-in, to provide features of the above described implementation.

Implementations can assign wireless resources in the form of bundled transmissions including repeated transmissions of payload data. By repeating transmissions in bundled transmissions, the implementations described herein improve the likelihood of receipt and thereby reduce the likelihood that retransmissions of failed transmissions need to be scheduled and sent. This makes more efficient use of the available wireless resources. The number of transmissions within each bundle are determined depending on the received signal strength for previous corresponding transmissions. This allows a minimum threshold for signal quality (based on an indicator of received signal strength, such as average RSSI or variation in RSSI) to be applied. Certain implementations allocate wireless resources in a manner that minimizes the global transmission time or global block length (total number of transmissions) whilst maintaining this minimum threshold for signal quality.

Execution of the communications controller software by the processor 201 causes the methodolgy as described herein to be implemented. The communications controller software can be embedded in original equipment, or can be provided, as a whole or in part, after manufacture. For instance, the communications controller software can be introduced, as a whole, as a computer program product, which may be in the form of a download, or to be introduced via a computer program storage medium, such as an optical disk. Alternatively, modifications to an existing communications controller 207 can be made by an update, or plug-in, to provide features of the above described implementation.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of the inventions. Indeed, the novel methods and devices described herein may be embodied in a variety of other forms; furthermore, various omissions, substitutions and changes in the form of the methods and systems described herein may be made.

The invention claimed is:

1. A computing system, comprising:
a processor configured to:
determine a wireless resource allocation for a downlink transmission from a base station to a group of devices and an uplink transmission from the group of devices to the base station, wherein a bundled transmission over an available wireless resource is scheduled based on the wireless resource allocation, wherein the bundled transmission includes one or more repetitions of data, wherein the system schedules the uplink transmission and the downlink transmission for closed loop control between a controller and the group of devices in a wireless network, and wherein determining the wireless resource allocation includes, for the bundled transmission:
  determining a bundle length specifying a number of repetitions within the bundled transmission required to meet more than a predefined value for received signal quality, the bundle length being less than a predefined length and the number of repetitions being less than a predefined number, and
  determining the wireless resource allocation to meet the determined bundle length;
send, via the base station, to the group of devices a joint resource allocation message including wireless resource allocation information defining the wireless resource allocation;
include a wireless resource allocation for uplink acknowledgements of receipt in the joint resource allocation message, the uplink acknowledgements of receipt being received from the devices in the group; and
in response to a failure to receive an acknowledgement of receipt from one or more of the devices,
  reallocate the one or more devices into a different group; and
  allocate wireless resources for uplink and downlink transmissions to the different group.

2. The computing system of claim 1, wherein determining the bundle length includes:
obtaining a measurement of a previous received signal quality; and
determining, based on the previous received signal quality, the number of repetitions to meet more than the predefined value for the received signal quality.

3. The computing system of claim 2,
wherein the downlink transmission is scheduled as a multi-cast transmission to the group of devices, and
wherein obtaining the measurement of the previous received signal quality for a previous downlink bundled transmission comprises includes determining a minimum received signal quality for the previous downlink bundled transmission across the group of devices.

4. The computing system of claim 2, wherein the processor is further configured to, in response to determining that the received signal quality for a bundled transmission from a previous cycle has fallen below the predefined value for the received signal quality, increase the bundle length for the bundled transmission to meet the predefined value for the received signal quality.

5. The computing system of claim 1,
wherein determining the wireless resource allocation to meet the determined bundle length includes assigning, for each transmission, a set of wireless resource elements distributed over time and sub-carrier frequency, and
wherein the set of wireless resource elements are determined such that one or both of overall transmission time allocation and overall sub-carrier frequency allocation are less than a preset value whilst ensuring the predefined value for the received signal quality is met.

6. The computing system of claim 1, wherein, for the bundled transmission, one or more of the repetitions of data are transmitted with forward error correction information.

7. The computing system of claim 1, wherein the processor is further configured to:
send, via a wireless transmitter, a downlink bundled transmission to the group of devices by using to the determined wireless resource allocation for the downlink transmission, and
receive from each device in the group, via a wireless receiver, an uplink bundled transmission over the determined wireless resource allocation for the uplink transmission.

8. The computing system of claim 1, wherein the processor is further configured to:
determine a wireless resource allocation for an uplink acknowledgement of receipt from each device in the group;
include the wireless resource allocation for the uplink acknowledgement of receipt in the joint resource allocation message; and
in response to a failure to receive an acknowledgement of receipt from one or more of the devices over the determined wireless resource allocation for the uplink acknowledgment of receipt,
  reallocate the one or more devices into a different group, and
  allocate wireless resources for uplink and downlink transmissions to the different group separately to the determined wireless resource allocation to the group.

9. The computing system of claim 1, wherein:
the wireless resource is divided into subgroupings of symbols and subcarriers; and
for each bundled transmission, the repetitions of data are repeated across adjacent subgroupings.

10. The computing system of claim 9, wherein each subgrouping is a short transmission time interval or a mini-slot, the short transmission time being shorter than a 4G Long Term Evolution transmission time interval.

11. The computing system of claim 1, wherein the joint resource allocation message is sent using wireless resources that are allocated to the sending of the joint resource allocation message and are separate from wireless resources for transmission of payload data to the devices.

12. The computing system of claim 1, wherein the joint resource allocation message is sent using wireless resources that fall within a subset of wireless resources that may also be shared with downlink transmissions.

13. A computer-implemented method, comprising:
   determining a wireless resource allocation for a downlink transmission from a base station to a group of devices and an uplink transmission from the group of devices to the base station, wherein a bundled transmission over an available wireless resource is scheduled based on the wireless resource allocation, wherein the bundled transmission includes one or more repetitions of data, wherein the uplink transmission and the downlink transmission are scheduled for closed loop control between a controller and the group of devices in a wireless network, and wherein determining the wireless resource allocation includes, for the bundled transmission:
      determining a bundle length specifying a number of repetitions within the bundled transmission required to meet more than a predefined value for received signal quality, the bundle length being less than a predefined length and the number of repetitions being less than a predefined number, and
      determining the wireless resource allocation to meet the determined bundle length;
   sending, via the base station, to the group of devices a joint resource allocation message including wireless resource allocation information defining the wireless resource allocation;
   including a wireless resource allocation for uplink acknowledgements of receipt in the joint resource allocation message, the uplink acknowledgements of receipt being received from the devices in the group; and
   in response to a failure to receive an acknowledgement of receipt from one or more of the devices,
      reallocating the one or more devices into a different group; and
      allocating wireless resources for uplink and downlink transmissions to the different group.

14. A non-transitory computer readable medium comprising computer-executable instructions that, when executed by a processor, cause the processor to implement a method, the method comprising:
   determining a wireless resource allocation for a downlink transmission from a base station to a group of devices and an uplink transmission from the group of devices to the base station, wherein a bundled transmission over an available wireless resource is scheduled based on the wireless resource allocation, wherein the bundled transmission includes one or more repetitions of data, wherein the uplink transmission and the downlink transmission are scheduled for closed loop control between a controller and the group of devices in a wireless network, and wherein determining the wireless resource allocation includes, for the bundled transmission:
      determining a bundle length specifying a number of repetitions within the bundled transmission required to meet more than a predefined value for received signal quality, the bundle length being less than a predefined length and the number of repetitions being less than a predefined number, and
      determining the wireless resource allocation to meet the determined bundle length;
   sending, via the base station, to the group of devices a joint resource allocation message including wireless resource allocation information defining the wireless resource allocation;
   including a wireless resource allocation for uplink acknowledgements of receipt in the joint resource allocation message, the uplink acknowledgements of receipt being received from the devices in the group; and
   in response to a failure to receive an acknowledgement of receipt from one or more of the devices,
      reallocating the one or more devices into a different group; and
      allocating wireless resources for uplink and downlink transmissions to the different group.

* * * * *